US012617346B2

(12) United States Patent
Sueoka et al.

(10) Patent No.: US 12,617,346 B2
(45) Date of Patent: May 5, 2026

(54) STRUCTURE

(71) Applicants:KYORAKU CO., LTD., Kyoto (JP);
**HAYASHI TELEMPU
CORPORATION**, Nagoya (JP)

(72) Inventors: Masaaki Sueoka, Chuo-ku (JP);
Ryuichi Ishida, Chuo-ku (JP); **Takashi
Imada, Chuo-ku (JP); Katsuki Tanaka**,
Nagoya (JP); Kenta Suzuki, Nagoya
(JP)

(73) Assignees: KYORAKU CO., LTD., Kyoto (JP);
**HAYASHI TELEMPU
CORPORATION**, Nagoya (JP)

( * ) Notice: Subject to any disclaimer, the term of this
patent is extended or adjusted under 35
U.S.C. 154(b) by 323 days.

(21) Appl. No.: 17/916,856

(22) PCT Filed: Apr. 21, 2021

(86) PCT No.: PCT/JP2021/016136
§ 371 (c)(1),
(2) Date: Oct. 4, 2022

(87) PCT Pub. No.: WO2021/220902
PCT Pub. Date: Nov. 4, 2021

(65) Prior Publication Data
US 2023/0182644 A1 Jun. 15, 2023

(30) Foreign Application Priority Data
Apr. 27, 2020 (JP) ................................. 2020-078627

(51) Int. Cl.
B60R 5/04 (2006.01)
F16C 11/12 (2006.01)
(Continued)

(52) U.S. Cl.
CPC ................ B60R 5/04 (2013.01); F16C 11/12
(2013.01); E05F 1/1215 (2013.01); E06B
2009/1538 (2013.01)

(58) Field of Classification Search
CPC ........... B60R 5/04; B60R 5/044; B60R 5/048;
E06B 2009/1538; E06B 2009/1555;
(Continued)

(56) References Cited

U.S. PATENT DOCUMENTS 1,084,111 A * 1/1914 Rolfson-Schmidt ........................
E05F 1/1215
16/305
2002/0095883 A1 * 7/2002 Lindgren ............ E04D 13/0305
52/204.5
(Continued)

FOREIGN PATENT DOCUMENTS

| JP | 2012-232653 A | 11/2012 |
| JP | 2014-034369 A | 2/2014 |
| JP | 2017-047833 A | 3/2017 |

OTHER PUBLICATIONS

International Search Report issued on Jul. 13, 2021 in correspond-
ing International Application No. PCT/JP2021/016136; 4 pages.

*Primary Examiner* — Johnnie A. Shablack
*Assistant Examiner* — Matthew R. Shepherd
(74) *Attorney, Agent, or Firm* — Maier & Maier, PLLC

(57) ABSTRACT

A structure usable as a luggage board or similar in a luggage
compartment of a vehicle, including a resin-molded body
and a torsion spring. The resin-molded body includes a front
wall spaced apart from a rear wall and a peripheral wall
connecting peripheries of the front and rear wall, as well as
first and second plate-shaped portions which are rotatably
coupled to each other with a hinge portion. The hinge
portion is formed by concaving the rear wall toward the front
wall, forming a hinge concave portion and welding the rear
(Continued)

wall to the front wall. The torsion spring includes first and second arms and a coil therebetween. The first arm is slidably supported by the first plate-shaped portion. The second arm is supported by the second plate-shaped portion. The number of a fixation tool inserted into the first plate-shaped portion to support the first arm is one or less.

3 Claims, 9 Drawing Sheets

(51) Int. Cl.
    *E05F 1/12*          (2006.01)
    *E06B 9/15*          (2006.01)

(58) Field of Classification Search
     CPC .............. E06B 2009/1566; F16C 11/12; E05F
                      1/1215; E05F 1/1016; E05F 1/1207;
                      E05D 1/00; E05D 1/04; E05D 1/06;
                      E05D 7/10
     See application file for complete search history.

(56)                 References Cited

U.S. PATENT DOCUMENTS

| | | | |
|---|---|---|---|
| 2008/0121778 A1* | 5/2008 | Imajou ................... | B60N 2/305 |
| | | | 248/590 |
| 2008/0135716 A1* | 6/2008 | Yeh .................... | H04N 1/00554 |
| | | | 248/597 |
| 2010/0026031 A1* | 2/2010 | Jouraku ................. | B60R 5/044 |
| | | | 296/37.16 |
| 2016/0032636 A1* | 2/2016 | Dai ........................ | E05F 5/006 |
| | | | 16/65 |
| 2016/0186474 A1* | 6/2016 | Tong ........................ | F16F 7/04 |
| | | | 16/250 |
| 2021/0180377 A1* | 6/2021 | Ishii ..................... | B29C 51/105 |
| 2023/0182644 A1* | 6/2023 | Sueoka ................... | F16C 11/12 |
| | | | 296/1.07 |

* cited by examiner

FIG. 8

STRUCTURE

TECHNICAL FIELD

The present invention relates to a structure that can be used as a luggage board or the like installed in the luggage compartment of a vehicle.

BACKGROUND ART

In Patent Literature 1, one end of a coil spring that constitutes a hinge mechanism of a plate-shaped member is inserted into a base resin and a core material, and the other end is arranged along a guide groove provided in a first plate-shaped portion. Further, by fixing a first reinforcing portion arranged so as to cover the guide groove to the first plate-shaped portion with two screws, the other end of the coil spring is slidably supported by the first plate-shaped portion.

CITATION LIST

Patent Literature

Patent Literature 1: JP-A-2014-34369

SUMMARY OF INVENTION

Technical Problem

In Patent Literature 1, a total of three components of one first reinforcing portion and two screws are used to support the other end of the coil spring, but it is desired to reduce the number of components.

The present invention has been made in view of such circumstances, and aims to provide a structure capable of reducing the number of components.

Solution to Problem

According to the present invention, there is provided a structure comprising a resin-molded body and a torsion spring, wherein: the resin-molded body comprises a front wall and a rear wall spaced apart from each other and a peripheral wall connecting peripheries of the front wall and the rear wall; the resin-molded body comprises first and second plate-shaped portions and a hinge portion; the first and second plate-shaped portions are rotatably coupled to each other with the hinge portion; the hinge portion is formed by making the rear wall concave toward the front wall to form a hinge concave portion and welding the rear wall to the front wall; the torsion spring comprises first and second arms and a coil portion provided therebetween; the first arm is slidably supported by the first plate-shaped portion; the second arm is supported by the second plate-shaped portion; and the number of a fixation tool inserted into the first plate-shaped portion to support the first arm is one or less.

In the structure of the present invention, the number of the fixation tools inserted into the first plate-shaped portion to slidably support the first arm is one or less, so compared to the configuration of Patent Literature 1, it is possible to reduce the number of components.

Hereafter, various embodiments of the present invention are exemplified. The embodiments shown below can be combined with each other.

Preferably, in the structure described above, the hinge concave portion is provided between a side wall on a side of the first plate-shaped portion and a side wall on a side of the second plate-shaped portion, and the first arm is inserted into the first plate-shaped portion through an insertion hole provided in the side wall on the side of the first plate-shaped portion.

Preferably, in the structure described above, the rear wall of the first plate-shaped portion is provided with a contact concave portion at a part facing the first arm in the first plate-shaped portion.

Preferably, in the structure described above, the first arm comprises a base portion and a tip portion, the base portion is a part that connects the coil portion and the tip portion, and an angle of the tip portion with respect to the base portion is 45 to 90 degrees.

Preferably, in the structure described above, the first arm is arranged along a guide groove provided on an outer surface of the rear wall of the first plate-shaped portion, the first arm is supported by the first plate-shaped portion by covering the guide groove with a plate while the first arm is arranged in the guide groove, and the plate is fixed to the first plate-shaped portion by inserting the fixation tool through a through hole of the plate.

Preferably, in the structure described above, the guide groove comprises first and second groove portions parallel to each other, the first arm comprises first and second parts parallel to each other, the second part being a part closer to a tip side of the first arm than the first part, and the first and second parts are arranged in the first and second groove portions, respectively.

BRIEF DESCRIPTION OF DRAWINGS

FIG. 8 is a cross-sectional view taken along C-C in FIG. 6.

DESCRIPTION OF EMBODIMENTS

Embodiments of the present invention will be described below with reference to the drawings. The various features of the embodiments shown below can be combined with each other. In addition, the invention can be made independently for each feature.

1. First Embodiment

The structure 1 according to the first embodiment of the present invention will be described with reference to FIG. 1 to FIG. 5. The structure 1 can be used as a luggage board or the like installed in the luggage compartment of a vehicle.

Figure 1:
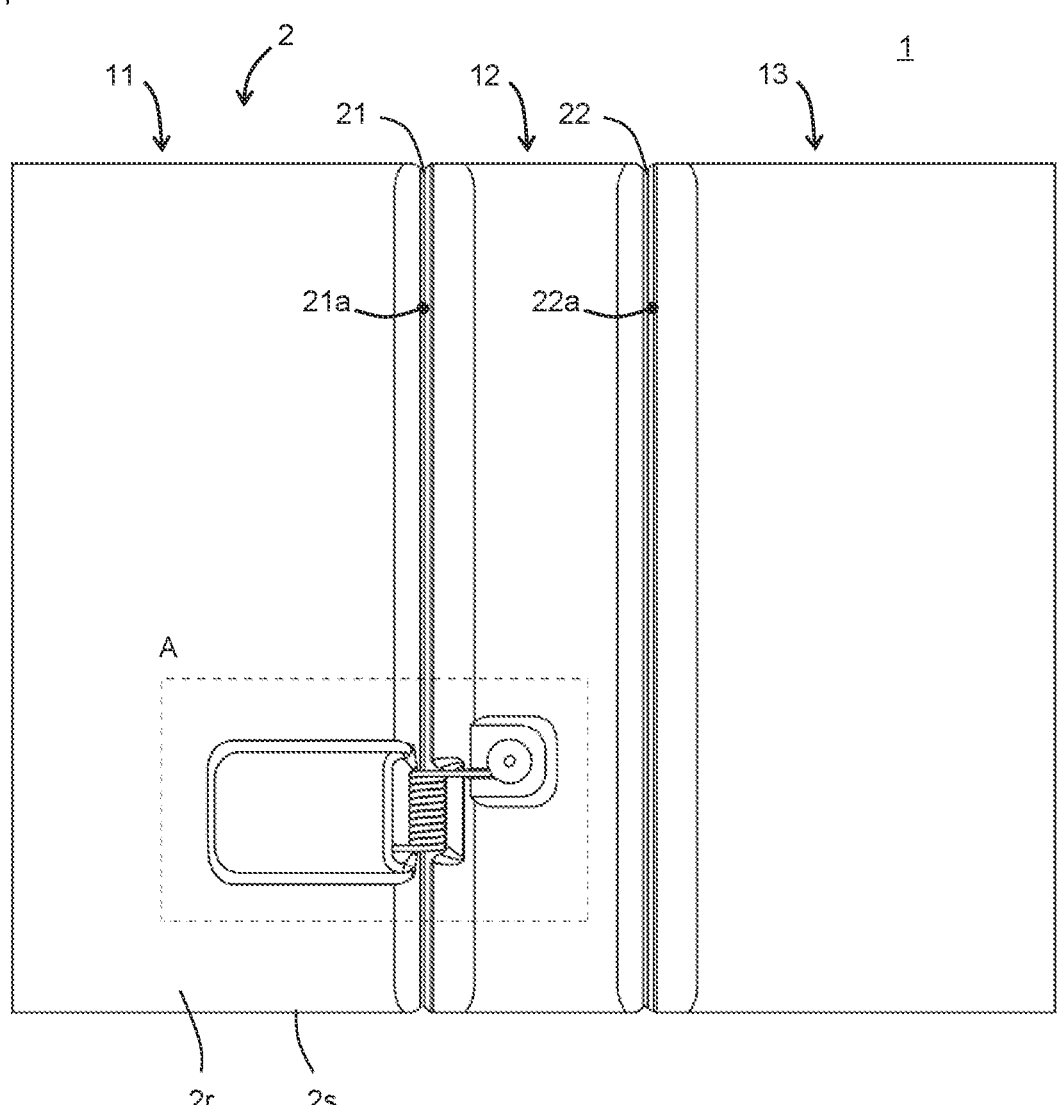
FIG. 1 is a plan view of a structure 1 according to the first embodiment of the present invention.
Figure 2:
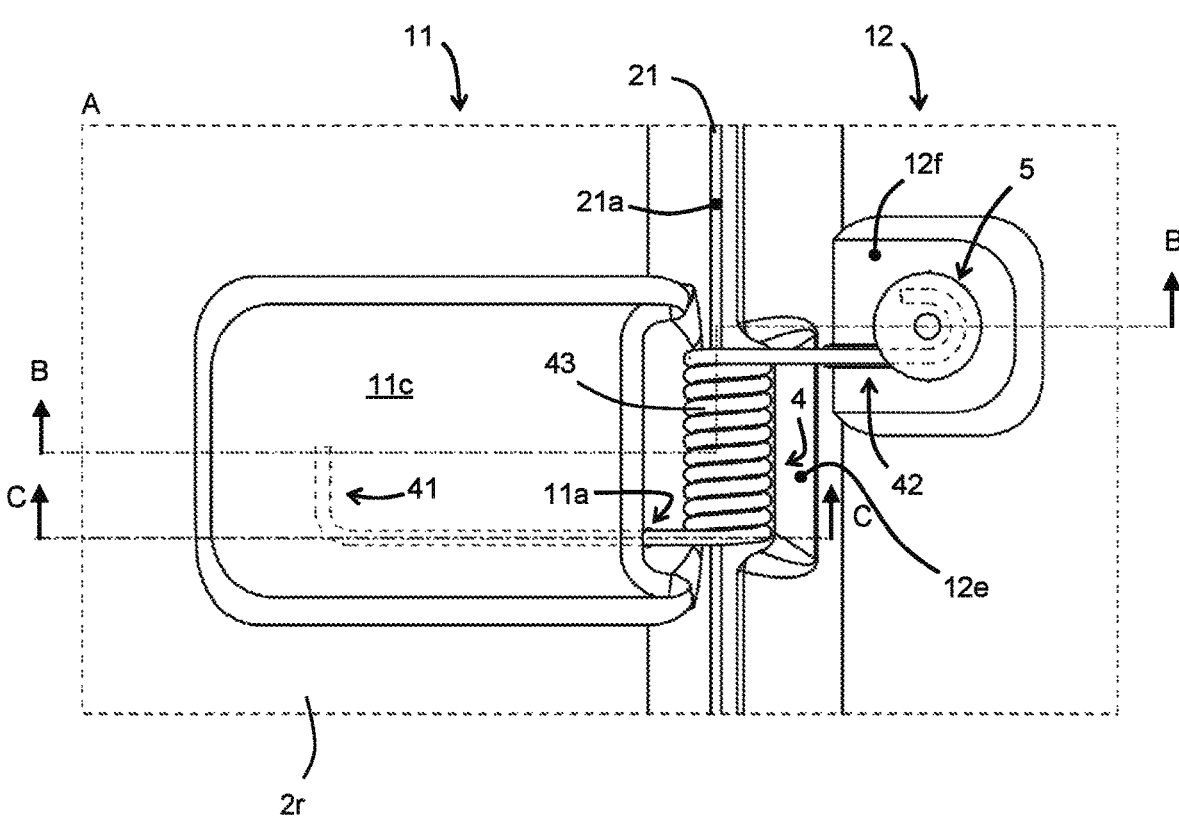
FIG. 2 is an enlarged view of an area A in FIG. 1.
Figure 3:
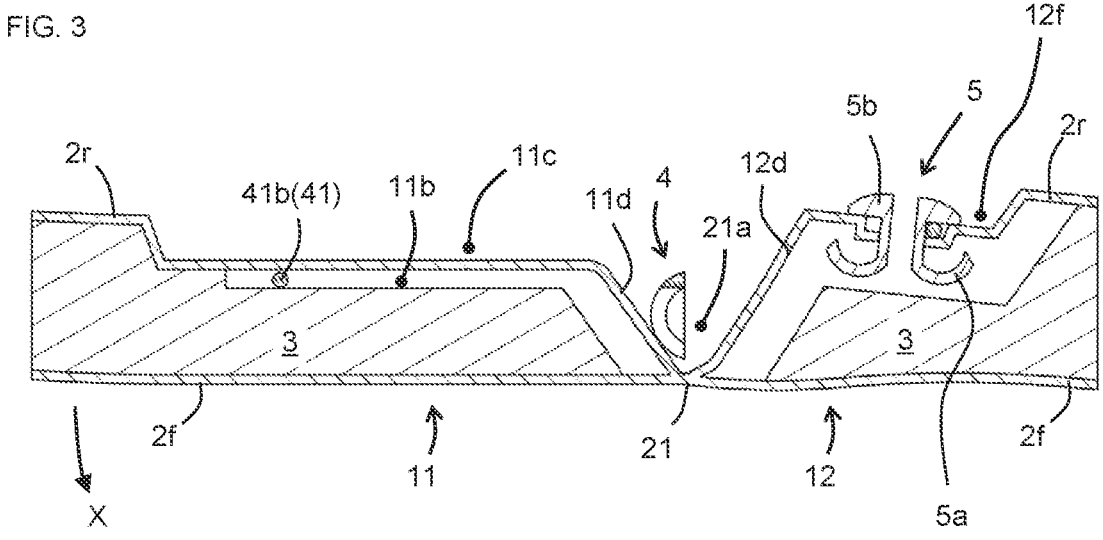
FIG. 3 is a cross-sectional view taken along B-B in FIG. 2.

As shown in FIG. 1 to FIG. 3, the structure 1 has a board shape and comprises a resin-molded body 2, a core material 3, and a torsion spring 4. The core material 3 is arranged inside the resin-molded body 2. The core material 3 can be omitted if unnecessary.

As shown in FIG. 1 and FIG. 3, the resin-molded body 2 comprises a front wall 2*f*, a rear wall 2*r*, and a peripheral wall 2*s*. The front wall 2*f* and the rear wall 2*r* are spaced apart from each other, and the peripheries of the front wall 2*f* and the rear wall 2*r* are connected by the peripheral wall 2*s*. The resin-molded body 2 can be formed, for example, by molding a pair of resin sheets made of polyolefin such as polypropylene. In addition, the core material 3 can be arranged inside the resin-molded body 2 by performing molding with the core material 3 arranged between the pair of resin sheets.

As shown in FIG. 1, the resin-molded body 2 comprises first to third plate-shaped portions 11 to 13, and first and second hinge portions 21 and 22. The plate-shaped portions 11 and 12 are rotatably coupled to each other with the hinge portion 21. The plate-shaped portions 12 and 13 are rotatably coupled to each other with the hinge portion 22. The plate-shaped portion 13 and the hinge portion 22 can be omitted if unnecessary. Also, the structure 1 may have three or more hinge portions.

As shown in FIG. 1 and FIG. 3, the hinge portions 21 and 22 can be formed by making the rear wall 2*r* concave toward the front wall 2*f* to form hinge concave portions 21*a* and 22*a* and welding the rear wall 2*r* and the front wall 2*f* (preferably by welding and compressing). The hinge portions 21 and 22 are preferably integral hinges formed integrally with the plate-shaped portions 11 to 13. The hinge concave portion 21*a* is provided between a side wall 11*d* on the side of the plate-shaped portion 11 and a side wall 12*d* on the side of the plate-shaped portion 12. The side walls 11*d* and 12*d* are formed by making the rear wall 2*r* concave toward the front wall 2*f*. It is preferable that the side walls 11*d* and 12*d* are tapered so that the space between them widens toward the rear wall 2*r* side.

Figure 5:
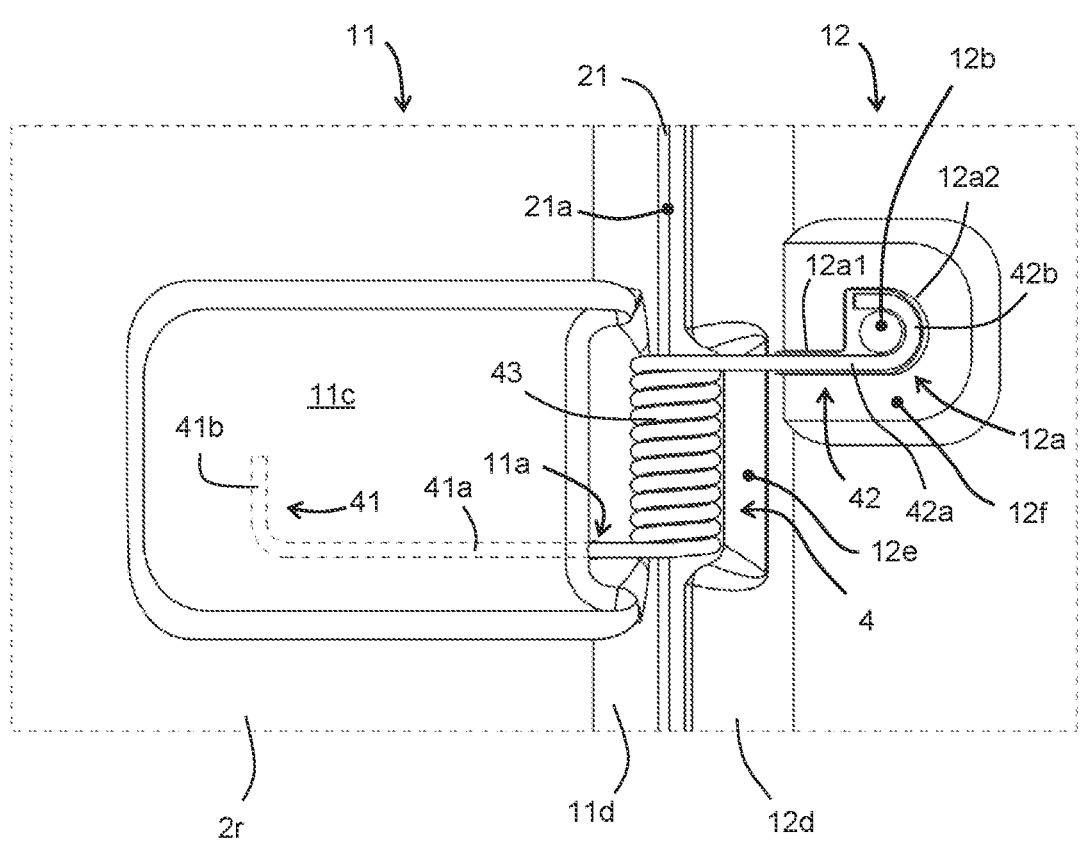
FIG. 5 is a view showing a state in which a blind rivet 5 is removed from FIG. 2.
Figure 6:
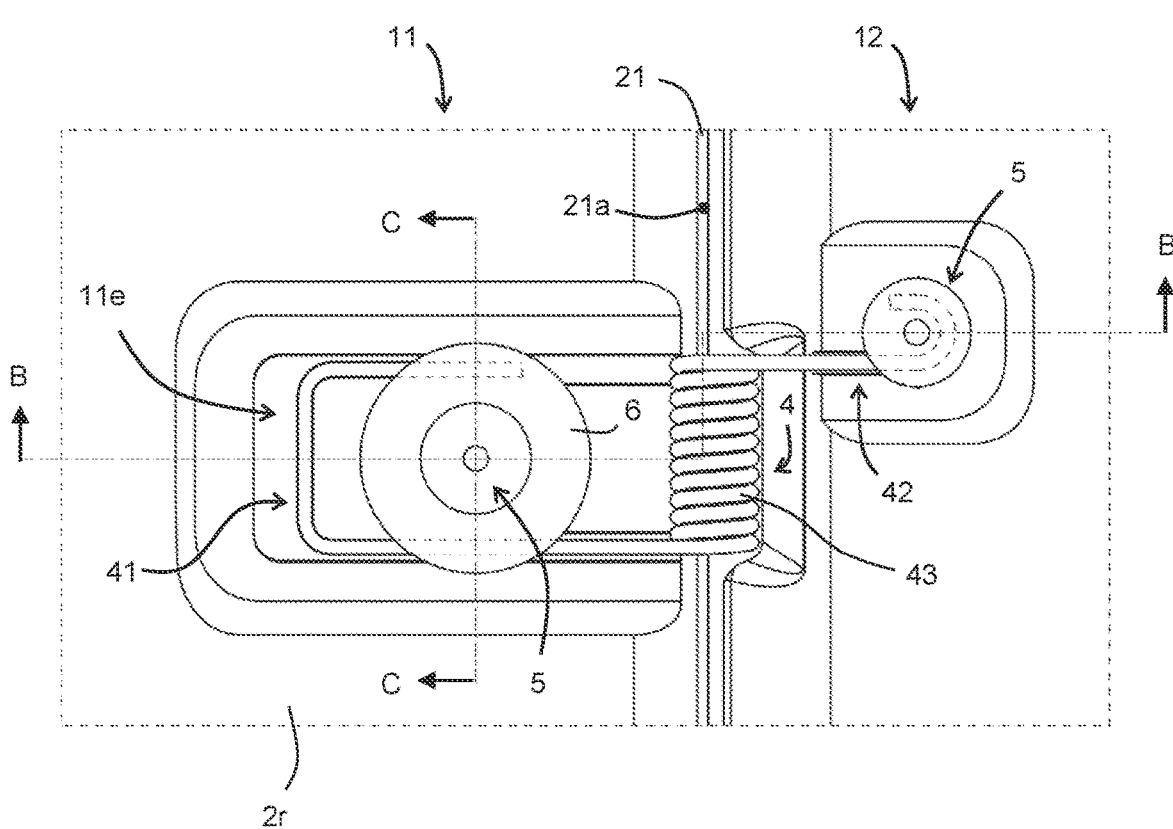
FIG. 6 is a view of a structure 1 according to the second embodiment of the present invention, corresponding to FIG. 2.

As shown in FIG. 2 and FIG. 5, the torsion spring 4 comprises first and second arms 41 and 42 and a coil portion 43 provided therebetween. The coil portion 43 is arranged at a position adjacent to the hinge portion 21. At least a part of the coil portion 43 is preferably arranged inside the hinge concave portion 21*a*. In addition, the side wall 12*d* may be provided with a housing concave portion 12*e* connected to the hinge concave portion 21*a*, and the coil portion 43 may be arranged so as to span the hinge concave portion 21*a* and the housing concave portion 12*e*. The torsion spring 4 is configured to generate a restoring force in the rotational direction by relatively rotating the arms 41 and 42 with respect to the central axis of the coil portion 43. By the restoring force of the torsion spring 4, for example, a restoring force is generated so as to transition from a state in which the plate-shaped portion 11 is rotated with respect to the plate-shaped portion 12 in the direction indicated by an arrow X in FIG. 3 (a state in which the front wall 2*f* of the plate-shaped portion 11 is inclined with respect to the front wall 2*f* of the plate-shaped portion 12) to the original state (a state in which the front wall 2*f* of the plate-shaped portion 11 and the front wall 2*f* of the plate-shaped portion 12 are flush with each other).

The arm 41 is slidably supported by the plate-shaped portion 11. The arm 41 is slidably supported by being inserted into the plate-shaped portion 11 through an insertion hole 11*a* provided in the plate-shaped portion 11. As shown in FIG. 5, the arm 41 comprises a base portion 41*a* and a tip portion 41*b*. The base portion 41*a* is a part that connects the coil portion 43 and the tip portion 41*b*. The base portion 41*a* is preferably linear. In this case, the base portion 41*a* can easily slide with respect to the insertion hole 11*a*. The base portion 41*a* preferably has a length such that it does not come off even when the plate-shaped portion 11 rotates with respect to the plate-shaped portion 12. The tip portion 41*b* is a part in the vicinity of the tip, and is preferably linear. The angle of the tip portion 41*b* with respect to the base portion 41*a* is preferably 45 to 90 degrees, preferably 60 to 90 degrees. In this case, the arm 41 is restrained from coming out of the insertion hole 11*a*. Specifically, this angle is, for example, 45, 50, 55, 60, 65, 70, 75, 80, 85, 90 degrees, and may be within a range between any two of the numerical values exemplified here.

Figure 4:
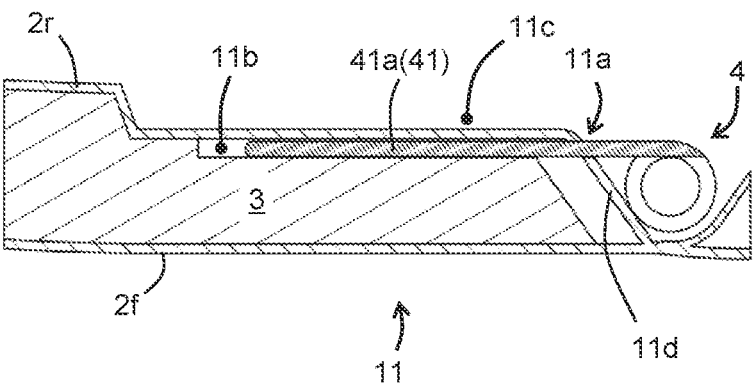
FIG. 4 is a cross-sectional view taken along C-C in FIG. 2.

As shown in FIG. 3 and FIG. 4, in the plate-shaped portion 11, it is preferable that the core material 3 does not exist in the part 11*b* into which the arm 41 is inserted. This is because if the core material 3 exists in this part 11*b*, it is difficult to insert the arm 41, and the arm 41 may be caught by the core material 3 and the arm 41 may not slide smoothly.

The rear wall 2*r* of the plate-shaped portion 11 is provided with a contact concave portion 11*c* at a part facing the arm 41 in the plate-shaped portion 11. The contact concave portion 11*c* can be formed by making the rear wall 2*r* of the plate-shaped portion 11 concave toward the front wall 2*f*. By providing the contact concave portion 11*c*, the base portion 41*a* of the arm 41 easily contacts the inner surface of the rear wall 2*r*. If the base portion 41*a* is separated from the rear wall 2*r*, the restoring force of the torsion spring 4 concentrates on the edge of the insertion hole 11*a*, which may cause the insertion hole 11*a* to widen. By providing the contact concave portion 11*c* and bringing the base portion 41*a* close to or in contact with the rear wall 2*r*, the restoring force of the torsion spring 4 can be received by being distributed over a wide range of the rear wall 2*r*, and thereby the widening of the insertion hole 11*a* can be suppressed.

Thus, in the present embodiment, since the arm 41 is slidably supported on the plate-shaped portion 11 simply by inserting the arm 41 into the insertion hole 11*a*, the number of fixation tools (screws, blind rivets, etc.) inserted into the plate-shaped portion 11 to support the arm 41 is zero, and the number of members for supporting the arm 41 is also zero. Therefore, according to the present embodiment, it is possible to reduce the number of components.

The arm 42 is supported by the plate-shaped portion 12. As shown in FIG. 5, the arm 42 comprises a base portion 42*a* and a curved portion 42*b*. The base portion 42*a* is a part that connects the coil portion 43 and the curved portion 42*b*. The curved portion 42*b* is a curved part, preferably an arcuate part. When the curved portion 42*b* is arcuate, the central angle of the arc of the curved portion 42*b* is, for example, 90 to 270 degrees, preferably 150 to 210 degrees. The plate-shaped portion 12 comprises a guide groove 12*a* and a rivet pilot hole 12*b*. The guide groove 12*a* is arranged inside a concave portion 12*f* provided in the plate-shaped portion 12. The guide groove 12*a* comprises a base portion 12*a*1 and a tip portion 12*a*2. The base portion 12*a*1 is a part for housing the base portion 42*a*. The tip portion 12*a*2 is a part for housing the curved portion 42*b*. Preferably, the rivet pilot hole 12*b* is arranged at the tip portion 12*a*2.

The base portion 42*a* and the curved portion 42*b* of the arm 42 are arranged in the base portion 12*a*1 and the tip portion 12*a*2 of the guide groove 12*a*, respectively. As shown in FIG. 3, a blind rivet 5 can be attached to the rivet pilot hole 12*b*. The blind rivet 5 comprises a hollow rivet body 5a, a flange 5b projecting radially outward from the rivet body 5a, and a mandrel (not shown) that passes through the inside of the rivet body 5a and is connected to the tip of the rivet body 5a. When the mandrel is pulled out with the rivet body 5a inserted into the rivet pilot hole 12b, the rivet body 5a expands radially outward, and the rear wall 2r is sandwiched between the flange 5b and the rivet body 5a, and thereby the blind rivet 5 is attached to the pilot hole 12b. In addition, by covering the curved portion 42b with the flange 5b, the arm 42 is prevented from coming off the plate-shaped portion 12. With such a method, the arm 42 is non-slidably supported by the plate-shaped portion 12. Also, the arm 42 may be slidably supported by the plate-shaped portion 12.

2. Second Embodiment

The structure 1 according to the second embodiment of the present invention will be described with reference to FIG. 6 to FIG. 9. The present embodiment is similar to the first embodiment, and the main difference is the difference in the method of supporting the arm 41. The following description will focus on the differences.

Figure 7:
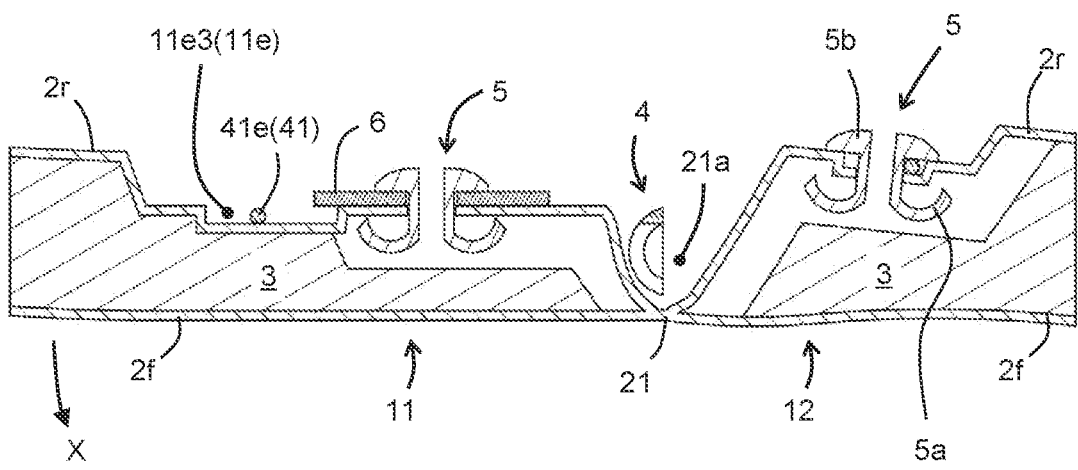
FIG. 7 is a cross-sectional view taken along B-B in FIG. 6.
Figure 8:
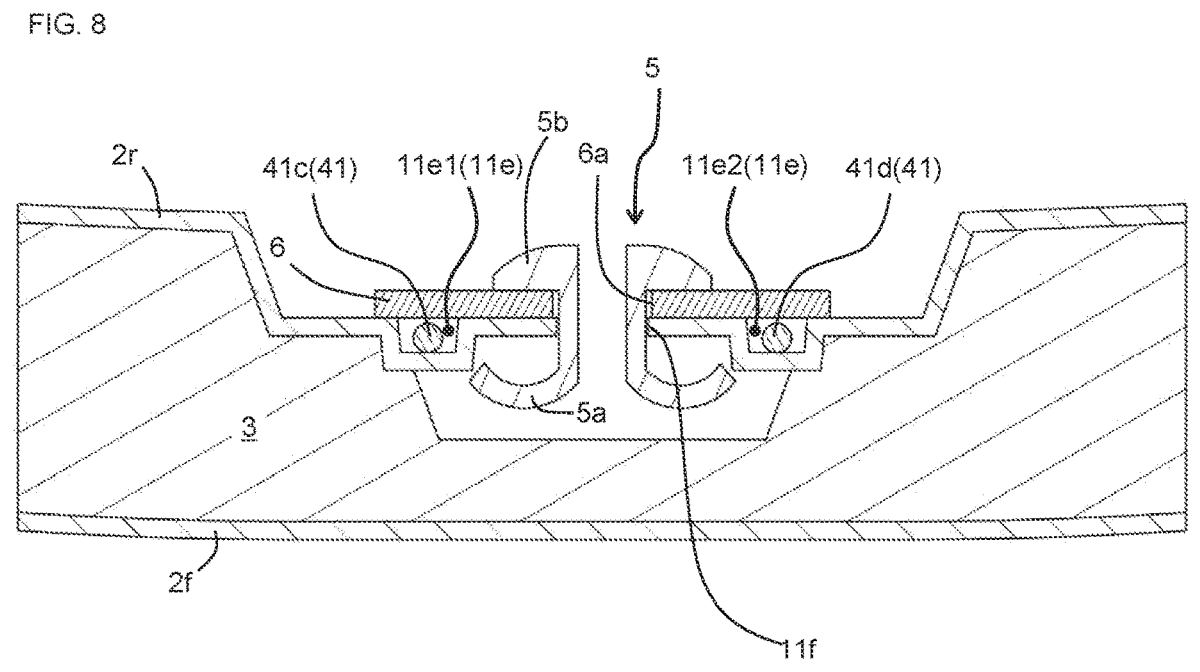

In the present embodiment, the arm 41 is arranged along a guide groove 11e provided on the outer surface of the rear wall 2r of the plate-shaped portion 11. As shown in FIG. 7 and FIG. 8, the guide groove 11e can be formed by making the rear wall 2r of the plate-shaped portion 11 concave toward the front wall 2f. As shown in FIG. 8, the arm 41 is slidably supported on the plate-shaped portion 11 by covering the guide groove 11e with a plate 6 while the arm 41 is arranged inside the guide groove 11e.

As shown in FIG. 8, the plate 6 can be fixed using one blind rivet 5. The rear wall 2r of the plate-shaped portion 11 is provided with a rivet pilot hole 11f. The pilot hole 11f is arranged at a position adjacent to the guide groove 11e. The plate 6 has a through hole 6a. When the mandrel (not shown) is pulled out with the rivet body 5a inserted into the pilot hole 11f, the rivet body 5a expands radially outward, and the rear wall 2r and the plate 6 are sandwiched between the flange 5b and the rivet body 5a, and thereby the plate 6 is fixed to the rear wall 2r. The plate 6 is preferably a washer having a diameter larger than that of the flange 5b and a size capable of covering the guide groove 11e. Such washers are available inexpensively.

According to such a configuration, the number of fixation tools (screws, blind rivets, etc.) inserted into the plate-shaped portion 11 to support the arm 41 is one. In addition, the number of members (plate 6 and blind rivet 5) used to support the arm 41 is one. Therefore, according to the present embodiment, it is possible to reduce the number of components.

Figure 9:
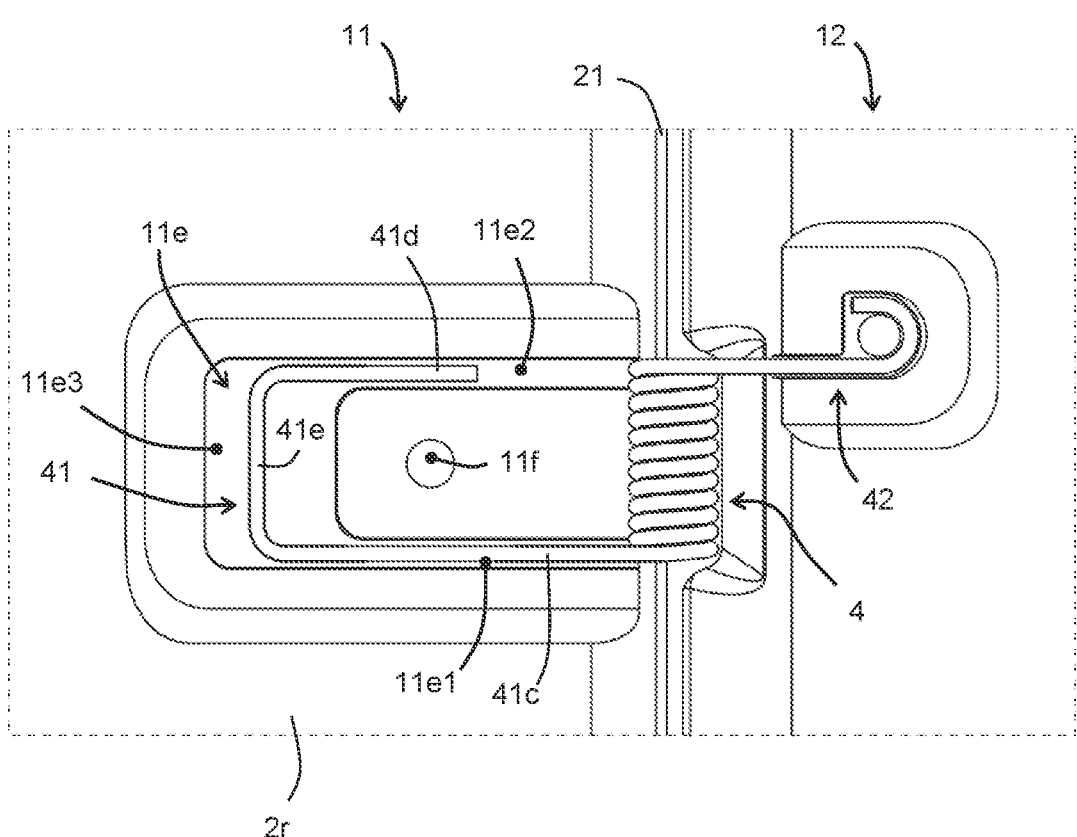
FIG. 9 is a view showing a state in which a blind rivet 5 and a plate 6 are removed from FIG. 6.

As shown in FIG. 8 and FIG. 9, the guide groove 11e preferably comprises first and second groove portions 11e1 and 11e2 parallel to each other and a connecting groove portion 11e3 that connects the groove portions 11e1 and 11e2. The groove portions 11e1 and 11e2 are preferably linear. The arm 41 comprises first and second parts 41c and 41d parallel to each other and a connecting portion 41e that connects the parts 41c and 41d. The parts 41c and 41d are preferably linear. The parts 41c and 41d are arranged inside the groove portions 11e1 and 11e2, and when the arm 41 slides, the parts 41c and 41d can slide along the groove portions 11e1 and 11e2. In addition, the connecting portion 41e is arranged inside the connecting groove portion 11e3, and when the arm 41 slides, the connecting portion 41e can slide in the connecting groove portion 11e3.

The plate 6 preferably covers both the groove portions 11e1 and 11e2. The pilot hole 11f is preferably arranged between the groove portions 11e1 and 11e2, and is preferably arranged in the center between the groove portions 11e1 and 11e2. In such a configuration, the restoring force of the torsion spring 4 is applied to the plate 6 and the blind rivet 5 fixing it via the parts 41c and 41d. Since the restoring force is applied to the left and right of the blind rivet 5 in a well-balanced manner, there is an advantage that the force applied to the blind rivet 5 is not biased.

DESCRIPTION OF THE REFERENCE NUMERAL

1: structure, 2: resin-molded body, 2f: front wall, 2r: rear wall, 2s: peripheral wall, 3: core material, 4: torsion spring, 41: first arm, 41a: base portion, 41b: tip portion, 41c: first part, 41d: first part, 41e: connecting portion, 42: second arm, 42a: base portion, 42b: curved portion, 43: coil portion, 5: blind rivet, 5a: rivet body, 5b: flange, 6: plate, 6a: through hole, 11: first plate-shaped portion, 11a: insertion hole, 11b: part, 11c: contact concave portion, 11d: side wall, 11e: guide groove, 11e1: first groove portion, 11e2: second groove portion, 11e3: connecting groove portion, 11f: rivet pilot hole, 12: second plate-shaped portion, 12a: guide groove, 12a1: base portion, 12a2: tip portion, 12b: rivet pilot hole, 12d: side wall, 12e: housing concave portion, 12f: concave portion, 13: third plate-shaped portion, 21: first hinge portion, 21a: hinge concave portion, 22: second hinge portion, 22a: hinge concave portion, A: area, X: arrow.

The invention claimed is:

1. A structure, comprising:
   a resin-molded body;
   a core material; and
   a torsion spring, wherein:
   the resin-molded body comprises a front wall and a rear wall spaced apart from each other,
   the resin-molded body comprises a first portion, a second portion, and a hinge portion,
   the first portion and the second portion are rotatably coupled to each other with the hinge portion,
   the hinge portion is formed by making the rear wall concave toward the front wall to form a hinge concave portion and welding the rear wall to the front wall,
   the torsion spring comprises a first arm, a second arm, and a coil portion provided therebetween,
   the first arm is slidably supported by the first portion,
   the second arm is supported by the second portion,
   the hinge concave portion is provided between a side wall on a side of the first portion and a side wall on a side of the second portion,
   the first arm is inserted into the first portion through an insertion hole provided in the side wall on the side of the first portion,
   the rear wall of the first portion is provided with a contact concave portion at a part facing the first arm in the first portion,
   the contact concave portion is a depression defined in the rear wall, wherein the rear wall is depressed towards the front wall at the contact concave portion,
   the core material is disposed within the resin molded body, and
   the first arm is disposed, with respect to a thickness direction of the first portion, in a space between the contact concave portion of the rear wall and the core material.

2. The structure of claim 1, wherein:

the first arm comprises a base portion and a tip portion, the base portion is a part that connects the coil portion and the tip portion, and an angle of the tip portion with respect to the base portion is 45 to 90 degrees.

3. A structure, comprising:

a resin-molded body;

a core material; and a torsion spring, wherein:

the resin-molded body comprises a front wall and a rear wall spaced apart from each other, the resin-molded body comprises a first portion, a second portion, and a hinge portion, the first portion and the second portion are rotatably coupled to each other with the hinge portion, the hinge portion is formed by making the rear wall concave toward the front wall to form a hinge concave portion and welding the rear wall to the front wall, the torsion spring comprises a first arm, a second arm, and a coil portion provided therebetween, the first arm is slidably supported by the first portion, the second arm is supported by the second portion, the hinge concave portion is provided between a side wall on a side of the first portion and a side wall on a side of the second portion, the first arm is inserted into the first portion through an insertion hole provided in the side wall on the side of the first portion, the rear wall of the first portion is provided with a contact concave portion at a part facing the first arm in the first portion, the contact concave portion is a depression defined in the rear wall, wherein the rear wall is depressed towards the front wall at the contact concave portion, the core material is disposed within the resin molded body, and the first arm is disposed, with respect to a direction perpendicular to a bottom surface of the contact concave portion, in a space between the contact concave portion of the rear wall and the core material.

* * * * *